3,047,628
BENZYLAMINE DERIVATIVES
Moses Wolf Goldberg, Upper Montclair, and Sidney Teitel, Nutley, N.J., assignors to Hoffmann-La Roche Inc., Nutley, N.J., a corporation of New Jersey
No Drawing. Original application Feb. 19, 1957, Ser. No. 641,018, now Patent No. 2,879,293, dated Mar. 24, 1959. Divided and this application Jan. 16, 1959, Ser. No. 787,115
6 Claims. (Cl. 260—570.7)

This application is a division of our copending application Serial No. 641,018, filed February 19, 1957, now U.S. Patent No. 2,879,293.

This invention relates to new benzylamine derivatives. More particularly, the invention relates to 2- or 4-(dilower alkylamino-lower alkoxy)benzylamine and acid addition salts thereof. These compounds, when reacted with a 3,4,5-trimethoxybenzoyl halide, preferably in an organic solvent such as benzene or acetonitrile at reflux temperature, produce 2-(dilower alkylamino-lower alkoxy)-N-(3,4,5-trimethoxybenzoyl)benzylamine, 4-dilower alkylamino - lower alkoxy) - N - (3,4,5-trimethoxybenzoyl)-benzylamine or salts thereof, respectively, compounds which are useful as antiemetic agents for the suppression of nausea and vomiting.

2-(Dilower alkyl-amino-lower alkoxy)benzylamine and 4-(dilower alkyl-amino-lower alkoxy)benzylamine are produced by etherifying o-hydroxybenzaldehyde or p-hydroxybenzaldehyde with the appropriate dilower alkyl-amino-lower alkyl halide at reflux temperature in an organic solvent to obtain the corresponding 2-(dilower alkyl-amino-lower alkoxy)benzaldehyde or 4-(dilower alkyl-amino-lower alkoxy)benzaldehyde. The benzaldehyde compound is then reductively aminated with ammonia, for example by hydrogenating under pressure at elevated temperature in the presence of a Raney nickel catalyst and ammoniacal alcohol solution, to obtain the 2- or 4-(dilower alkyl-amino-lower alkoxy)benzylamine.

The 2- and 4-(dilower alkyl-amino-lower alkoxy) benzylamines react with a variety of inorganic and organic acids to produce acid addition salts. Acid addition salts formed by the amines include hydrohalides such as hydrochloride, hydrobromide, hydroiodide, etc., sulfate, phosphate, nitrate, toluenesulfonate, citrate, oxalate, ascorbate, tartrate, acetate, salicylate, camphorsulfonate and benzenesulfonate. Pharmaceutically acceptable salts are preferred when therapeutic products such as those referred to above are to be prepared.

The following examples are illustrative of the invention. All temperatures are in degrees centigrade.

Example 1

To 122 grams (1 mol) of p-hydroxybenzaldehyde in 1 liter of chlorobenzene were added 66 grams (1.04 mols) of sodium methoxide (85%) and 108 grams (1 mol) of 2-dimethylaminoethyl chloride. The mixture was stirred and refluxed for 15 hours, then cooled and the precipitated sodium chloride filtered off. The filtrate was concentrated at steam temperature under water vacuum, and the residual oil was fractionated in high vacuum, to give 4-(2-dimethylaminoethoxy)benzaldehyde, B.$_{2.2}$ 145°, $n_D^{25}$=1.5471.

Two teaspoons of Raney nickel catalyst were added to a solution of 65.6 grams (0.34 mol) of 4-(2-dimethylaminoethoxy)benzaldehyde in 300 ml. of 10% ammoniacal ethanol. The mixture was hydrogenated at 80° and a pressure of 1,000 p.s.i. The catalyst was filtered off, the volatiles were distilled off and the residual oil was fractionated in high vacuum, to obtain 4-(2-dimethylaminoethoxy)benzylamine, B.$_{0.3}$ 120–123°, $n_D^{25}$=1.5321.

An aliquot of the amine was treated with a solution of oxalic acid in ether, giving crystalline 4-(2-dimethylaminoethoxy)benzylamine dioxalate monohydrate, M.P. 163–165° (crystallized from 60% ethanol).

Example 2

66.3 grams (0.3 mol) of 4-(2-diethylaminoethoxy) benzaldehyde (prepared by the method described in the first paragraph of Example 1 for the dimethylaminoethoxy analog) were reductively aminated, according to the procedure described in the second paragraph of Example 1, to obtain 4-(2-diethylaminoethoxy)-benzylamine, B.$_{0.3}$ 130°, $n_D^{25}$=1.5220.

Example 3

76 grams (0.62 mol) of p-hydroxybenzaldehyde and 73 grams (0.6 mol) of 3-dimethylaminopropyl chloride were reacted according to the procedure described in the first paragraph of Example 1 to produce 4-(3-dimethylaminopropoxy)benzaldehyde, B.$_{1.1}$ 143°, $n_D^{26}$=1.5415. 66.2 grams (0.32 mol) of 4-(3-dimethylaminopropoxy)-benzaldehyde were reductively aminated with ammoniacal ethanol, according to the procedure described in Example 1, to obtain 4-(3-dimethylaminopropoxy)benzylamine, B.$_{0.5}$ 124°, $n_D^{25}$=1.5235.

Example 4

122 grams (1 mol) of salicylaldehyde and 108 grams (1 mol) of 2-dimethylaminoethyl chloride were reacted as described in the first paragraph of Example 1, to produce 2 - (2 - dimethylaminoethoxy)benzaldehyde, B.$_{0.15}$ 100°, $n_D^{25}$=1.5348. 65.6 grams (0.34 mol) of 2-(2-dimethylaminoethoxy)benzaldehyde were reductively aminated according to the procedure described in Example 1 to obtain 2-(2-dimethylaminoethoxy)benzylamine, B.$_{0.4}$ 100°, $n_D^{25}$=1.5260.

We claim:

1. A member of the group consisting of 2-(dilower alkyl-amino-lower alkoxy)benzylamine, 4-(dilower alkyl-amino-lower alkoxy)benzylamine and acid addition salts thereof with pharmaceutically acceptable acids.
2. 4-(dilower alkyl-amino-lower alkoxy)benzylamine.
3. 4-(2-dimethylaminoethoxy)benzylamine.
4. 4-(2-diethylaminoethoxy)benzylamine.
5. 2-(dilower alkyl-amino-lower alkoxy)benzylamine.
6. 2-(2-dimethylaminoethoxy)benzylamine.

References Cited in the file of this patent
UNITED STATES PATENTS

| | | |
|---|---|---|
| 2,395,336 | MacMullen et al. | Feb. 19, 1946 |
| 2,687,416 | Persch et al. | Aug. 24, 1954 |
| 2,774,766 | Goldberg et al. | Dec. 18, 1956 |
| 2,879,293 | Goldberg et al. | Mar. 24, 1959 |

FOREIGN PATENTS

| | | |
|---|---|---|
| 778,919 | Great Britain | July 17, 1957 |